United States Patent

Miyahara et al.

[11] Patent Number: 6,067,872
[45] Date of Patent: May 30, 2000

[54] SPEED CHANGE OPERATION DEVICE FOR VEHICLE

[75] Inventors: Kazuyoshi Miyahara; Jitsumi Hanabusa; Tooru Kimura; Hiroshi Takahashi, all of Wako, Japan

[73] Assignee: Honda Giken Kogyo Kabushiki Kaisha, Tokyo, Japan

[21] Appl. No.: 09/041,704

[22] Filed: Mar. 13, 1998

[30] Foreign Application Priority Data

Mar. 31, 1997 [JP] Japan .................................. 9-081606
Mar. 31, 1997 [JP] Japan .................................. 9-081719
Mar. 31, 1997 [JP] Japan .................................. 9-081720
Mar. 31, 1997 [JP] Japan .................................. 9-081754

[51] Int. Cl.[7] .............................. B60K 20/00; G05G 1/00
[52] U.S. Cl. ................... 74/473.3; 74/473.1; 74/473.15; 74/470; 74/491
[58] Field of Search .............................. 74/473.3, 473.1, 74/473.15, 473.16, 491, 470

[56] References Cited

U.S. PATENT DOCUMENTS

| | | | |
|---|---|---|---|
| 4,771,856 | 9/1988 | Hutchison et al. | 74/473.1 X |
| 5,094,326 | 3/1992 | Schemelin et al. | 74/473.3 X |
| 5,566,583 | 10/1996 | Suzuki | 74/473.31 X |
| 5,927,151 | 7/1999 | Alber et al. | 74/473.3 |

FOREIGN PATENT DOCUMENTS

| | | |
|---|---|---|
| 7305442 | 11/1995 | Japan . |
| 7-323864 | 12/1995 | Japan . |
| 9-30278 | 2/1997 | Japan . |

*Primary Examiner*—David A. Bucci
*Assistant Examiner*—Marcus Charles
*Attorney, Agent, or Firm*—Armstrong, Westerman, Hattori, McLeland & Naughton

[57] ABSTRACT

A speed change operation device for a vehicle with continuously variable transmission having a running apparatus, a power source and a continuously variable transmission for transmitting power from the power source to the running apparatus. The speed change operation device comprises a first movable member operated by a speed change operation member to rotate; a second movable member connected to a speed change operation quantity input section of the continuously variable transmission directly or indirectly through a transmission means to change speed of the continuous variable transmission; a first rotation support shaft pivotally supporting the first movable member; and a second rotation support shaft disposed in parallel with the first rotation shaft for pivotally supporting the second movable member. And the first and second movable members are connected with each other so that rotating force is transmitted from the first movable member to the second movable member and alternatively the second movable member can rotate independently.

11 Claims, 9 Drawing Sheets

SPEED CHANGE OPERATION DEVICE FOR VEHICLE

BACKGROUND OF THE INVENTION

1. Field of the Invention

The present invention relates to a speed change operation device for a vehicle such as crawler truck, construction machine with caterpillar, cultivator or snowmobile having a continuously variable transmission to drive caterpillars or wheels and more particularly, a speed change operation device of this kind which has a simple construction, can be operated easily and provides the vehicle with good running and turning characteristics.

2. Description of the Related Art

In the crawler truck, construction machine with caterpillar, cultivator or snowmobile having right and left caterpillars, it is necessary to continuously change the revolving speed of the right and left caterpillars in order to change the direction of advance. Speed change operation devices to meet such demands have been proposed by Japanese Laid-Open Patent Publications Nos. 9-30278 (see FIG. 9), 7-323864 and 7-305442.

However, in those conventional speed change operation devices, the construction is complex and a plurality of rotation support shafts for pivotally supporting a plurality of movable members such as links, plates or the like constituting the speed change operation device are disposed to three-dimensionally cross each other in a complicated manner so that there are many parts producing rotary wear. The speed change operation devices are somewhat inferior in respect to their operation and wear resistance, where the size of movable parts such as links, levers, plates and the like must be increased thereby reducing the accuracy of the speed change control and increasing the size of the device.

Figure 9:
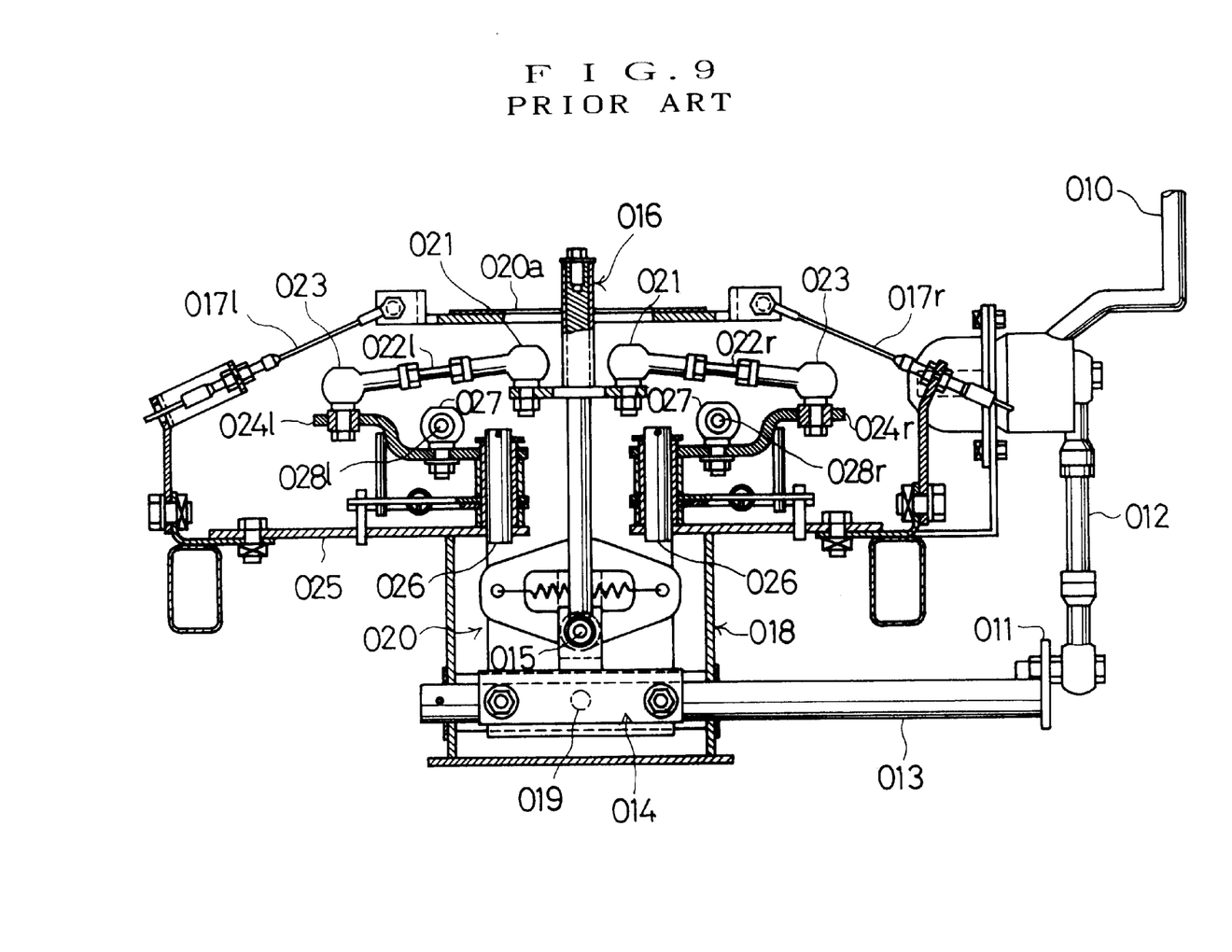
FIG. 9 is a cross sectional view of an essential part of a conventional speed change operation device.

Referring to FIG. 9, 010 denotes a change lever for setting the speed and advancing direction of a vehicle. Rotation of the change lever 010 is transmitted to a rotary shaft 013 through a rod 012 and an arm 011, and a bracket 014 integral with the rotary shaft 013 and a mixing lever 016, which is supported by the bracket so as to rock about a pivot pin 015 in a plane parallel with the surface of the drawing, are rocked in a plane perpendicular to the surface of the drawing.

On the one hand, a guide member 020 having a U-shaped section is supported on a base member 018 by two pivots 019 arranged in a front and rear direction (direction perpendicular to the surface of the drawing) so as to rock about the pivots 019 in a plane parallel with the surface of the drawing. When a steering wheel (not shown) is steered to the right, for example, movement of the steering wheel is transmitted to the guide member 020 through a Bawden wire 017r to move the guide member 020 to the right. When a guide slot 020a formed in an upper plate of the guide member 020 comes into contact with the mixing lever 016, the mixing lever 016 is moved to the right.

Thus, the mixing lever 016 receives an operation quantity relating to speed and running direction (advance or reverse) of the vehicle due to rotation of the change lever 010 and an operation quantity relating to turning direction due to steering of the steering wheel, synthesizes these two operation quantities and stops its movement at a position corresponding to the synthesized operation quantity.

In the meantime, push-pull rods 022r, 022l pivotally supported on the right and left side of the mixing lever 016 by inner ball joints 021, 021 rotates control arms 024r, 024l rotationally connected to the push-pull rods 022r, 022l by outer ball joints 023, 023, about pivotal shafts 026, 026 erected on a support plate 025. The rotations of the control arms 024r, 024l are stopped at positions corresponding to the stop position of the mixing lever 016.

The control arms 024r, 024l have front side ball joints 027, 027 at middle portions and ends of push-pull rods 028r, 028l are connected at positions of the ball joints 027, 027. Other ends of the push-pull rods 028r, 028l are connected to swash-plate rocking shafts of right and left static hydraulic pressure continuously variable transmissions (not shown) so that the right and left swash-plate rocking shafts are rotated by a quantity corresponding to a quantity of rotation of the control arms 024r, 024l until they stop. As the result, the vehicle undergoes a speed change operation such that wheels on the inner side of turning are rotated slower and wheels on the outer side of turning are rotated faster.

The above-mentioned speed change operation device has many rotation support shafts or rotation support shaft portions such as the rotary shaft 013, the pivot pin 015, the pivot 019, the inner side ball joints 021, 021, the outer side ball joints 023, 023, pivotal shafts 026, 026 and the front side ball joints 027, 027 which pivotally support respective many movable members such as the bracket 014, the mixing lever 016, the guide member 020, the push-pull rods 022r, 022l and the control arm 045r, 045l, and these rotation support shafts cross each other three-dimensionally and in a complicated manner so that rotary wear at respective parts and rocking or rotational shaking of the movable members is liable to occur. Therefore, the above speed changing operation device is inferior in respect of operation, wear resistance and control accuracy, and large-sized.

SUMMARY OF THE INVENTION

The present invention relates to a speed change operation device for a vehicle with a continuously variable transmission in which such problems as mentioned above have been overcome.

According to the present invention, there is provided a speed change operation device for a vehicle with a continuously variable transmission having a running apparatus, a power source and a continuously variable transmission for transmitting power from the power source to the running apparatus, comprising: a first movable member operated by a speed change operation member to rotate; a second movable member connected to a speed change operation quantity input section of the continuously variable transmission directly or indirectly through a transmission means to change speed of the continuously variable transmission; a first rotation support shaft pivotally supporting the first movable member; and a second rotation support shaft disposed in parallel with the first rotation support shaft for pivotally supporting the second movable member. The first and second movable members are connected with each other so that rotating power is transmitted from the first movable member to the second movable member and alternatively the second movable member can rotate independently.

Since the first and second movable members which constitute the speed change operation device rotate similarly in the same direction and the first and second rotation support shafts do not cross each other, the number of rotation support shafts can be reduced, rotation wear can be decreased and operation-easiness and wear-resistance of the speed change operation device is improved. Further, since the number of parts liable to cause shaking such as links, levers and plates pivotally supported by rotation support shafts are lessened, accuracy of speed change control is improved. In addition, the device can be miniaturized.

According to another aspect of the present invention, there is provided a speed change operation device for a vehicle with a continuously variable transmission having a right and left running apparatuses, a power source and a pair of right and left continuously variable transmissions for transmitting power from the power source to the running apparatuses, wherein the speed change operation device has a pair of right and left speed change operation units each comprising: a first movable member operated by a speed change operation member to rotate; a second movable member connected to a speed change operation quantity input section of the continuously variable transmission directly or indirectly through a transmission means to change speed of the continuously variable transmission; a first rotation support shaft pivotally supporting the first movable member; a second rotation support shaft disposed in parallel with the first rotation support shaft for pivotally supporting the second movable member; a third movable member pivotally supported by a shaft planted on the first movable member directed in right and left direction to rotate with the first movable member in a body and also to be operated by a turn operation member independently of the first movable member; and a fourth movable member having an end pivotally connected to the third movable member and another end pivotally connected to the second movable member so as to transmit rotating force of the third movable member to the second movable member, a connecting portion of the fourth movable member with the second movable member being positioned in concentric with the shaft pivotally supporting the third movable member when the speed change operation device is in a neutral position.

According to this speed change operation device, in addition to the above-mentioned advantages, the following additional advantage is obtainable. That is, an operation mechanism for changing speed and movement (forward-rearward) in the speed change operation device and an operation mechanism for turning the vehicle can be united in a compact construction.

DETAILED DESCRIPTION OF THE PREFERRED EMBODIMENT

Figure 1:
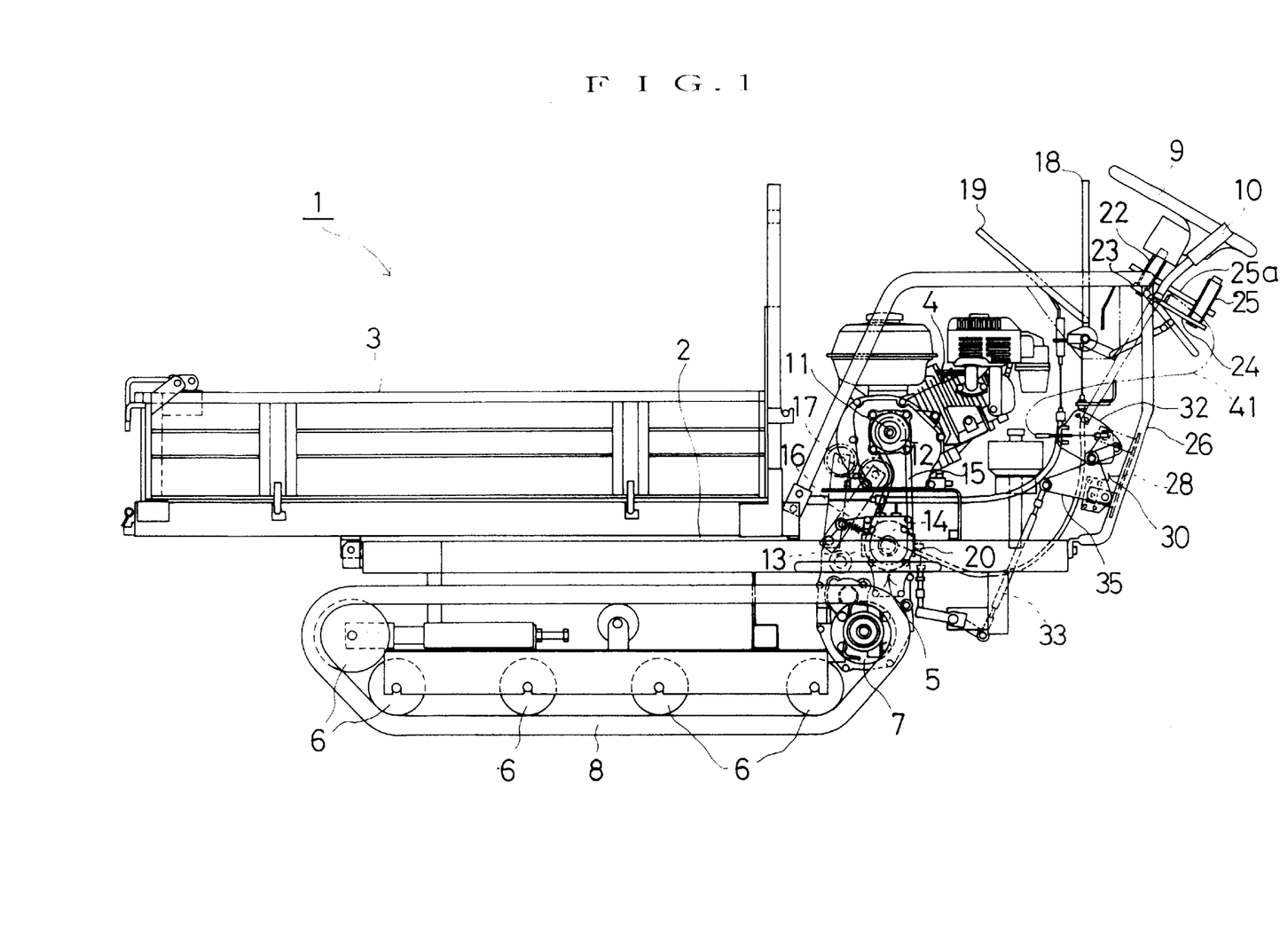
FIG. 1 is a side view of a crawler truck with a continuously variable transmission having a speed change operation device according to a preferred embodiment of the present invention.
Figure 2:
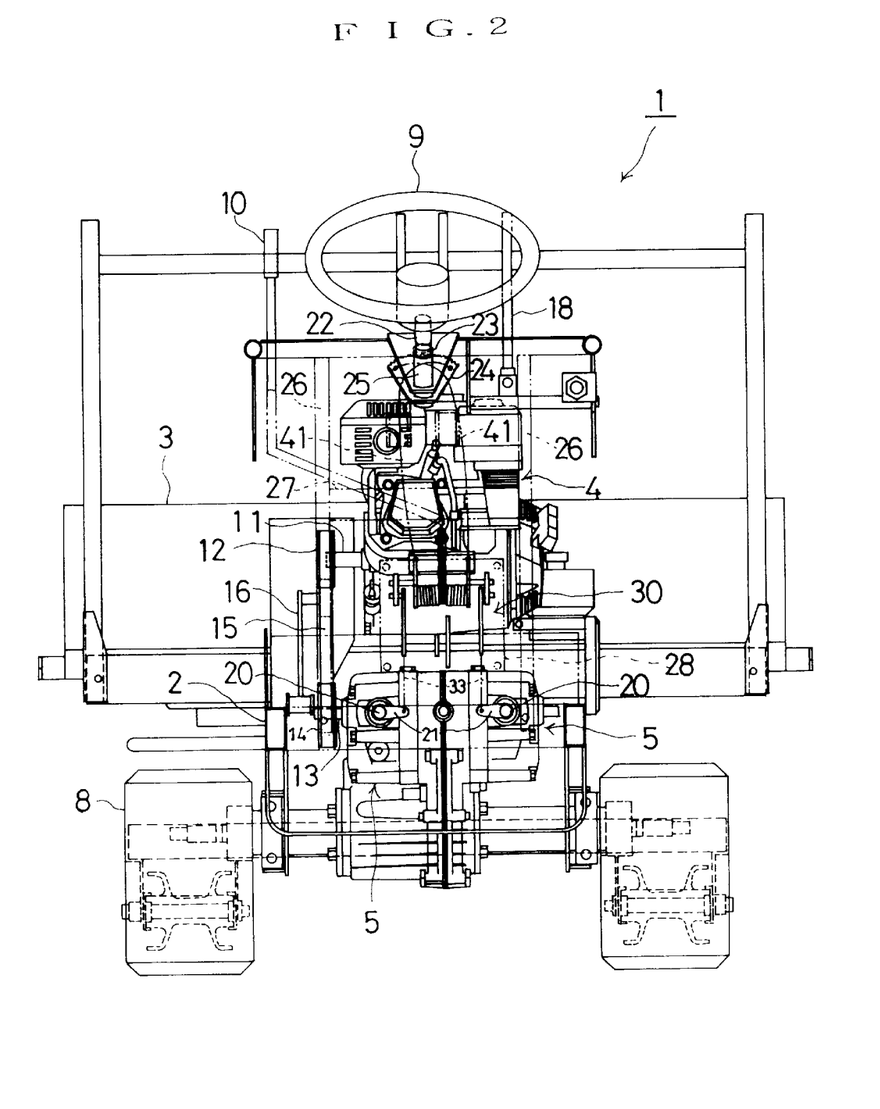
FIG. 2 is a rear view of the crawler truck.
Figure 3:
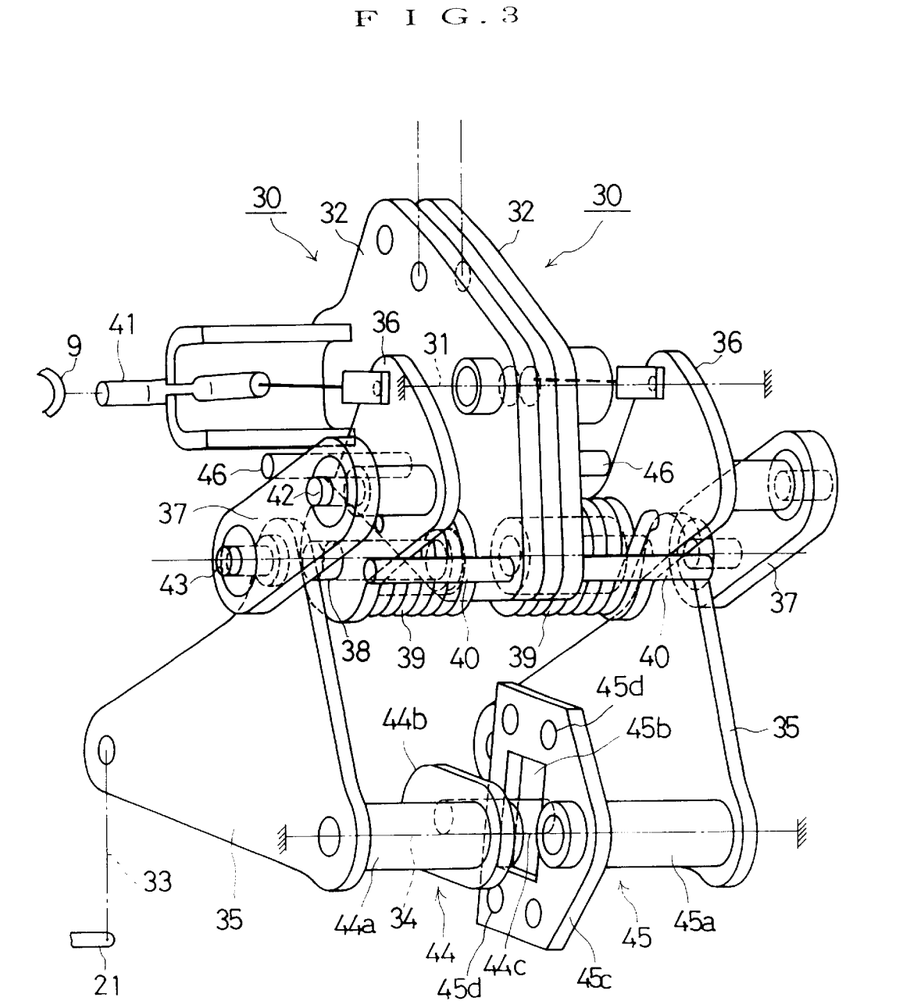
FIG. 3 is an enlarged perspective view of the speed change operation device.
Figure 4:
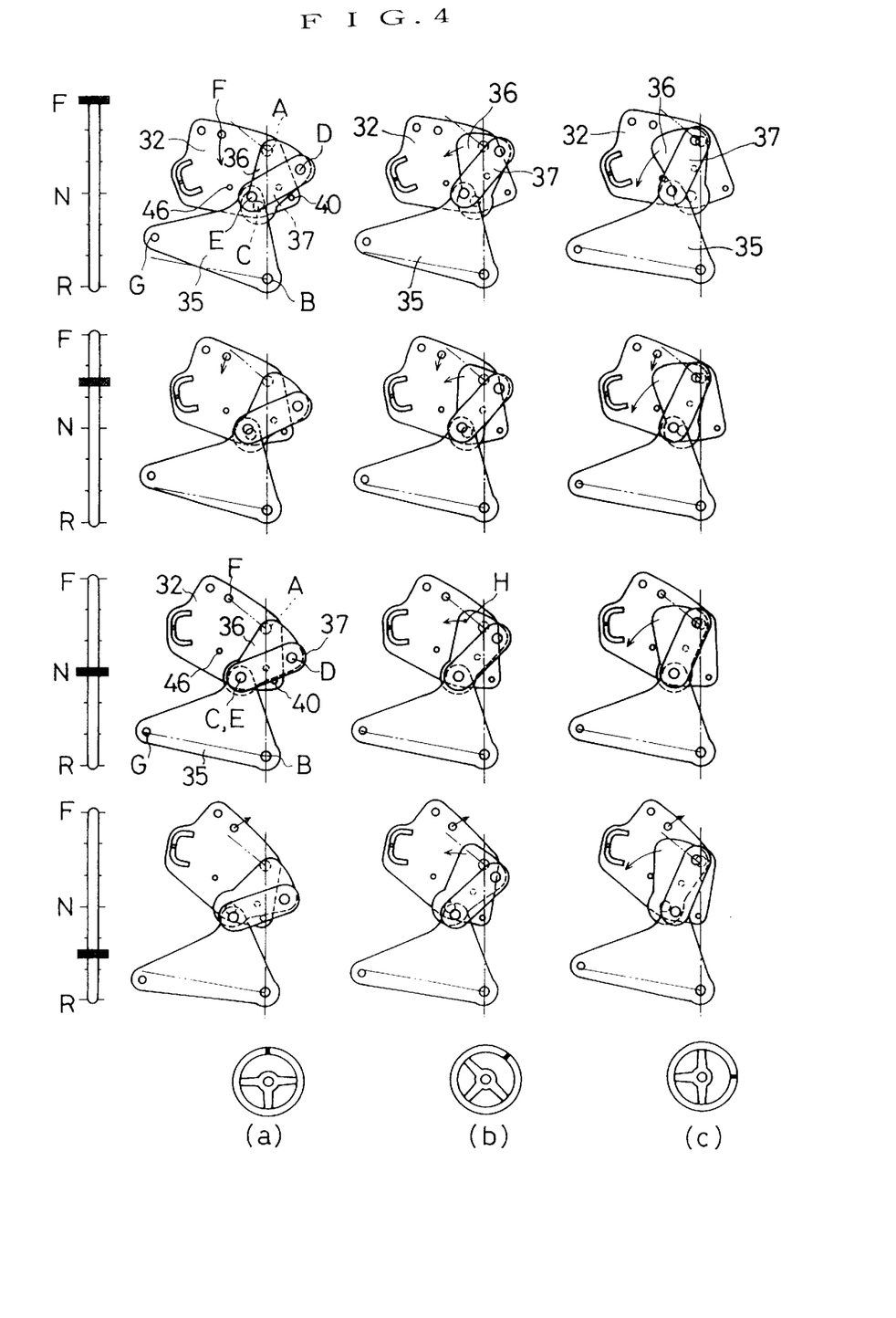
FIG. 4 is a view showing states of action of the speed change operation device.
Figure 5:
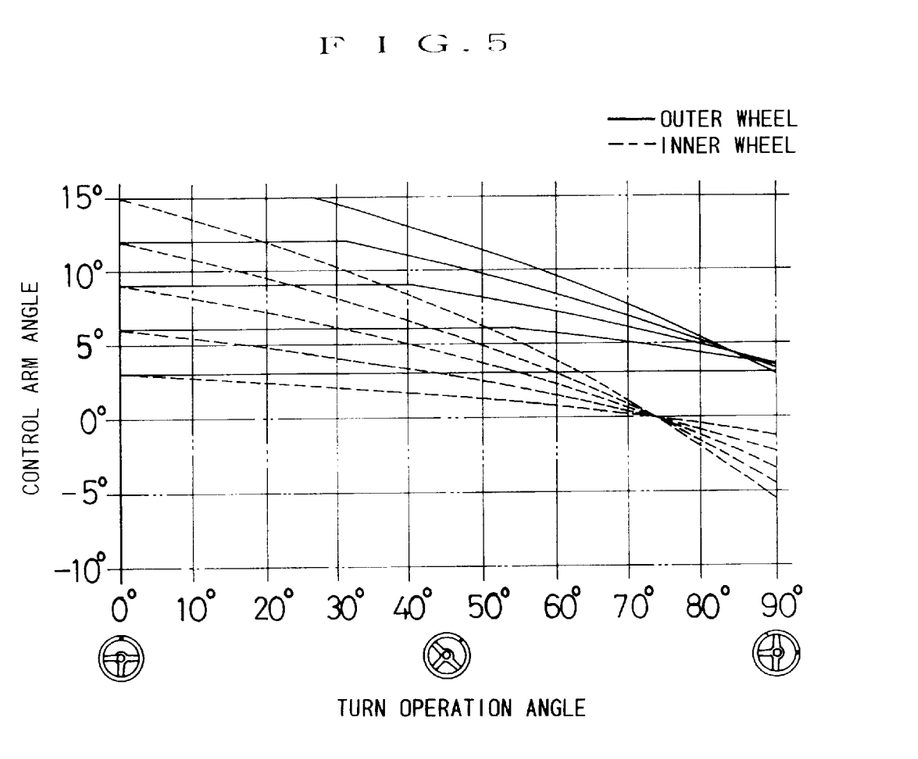
FIG. 5 is a graph showing characteristics of action of the speed change operation device.
Figure 6:
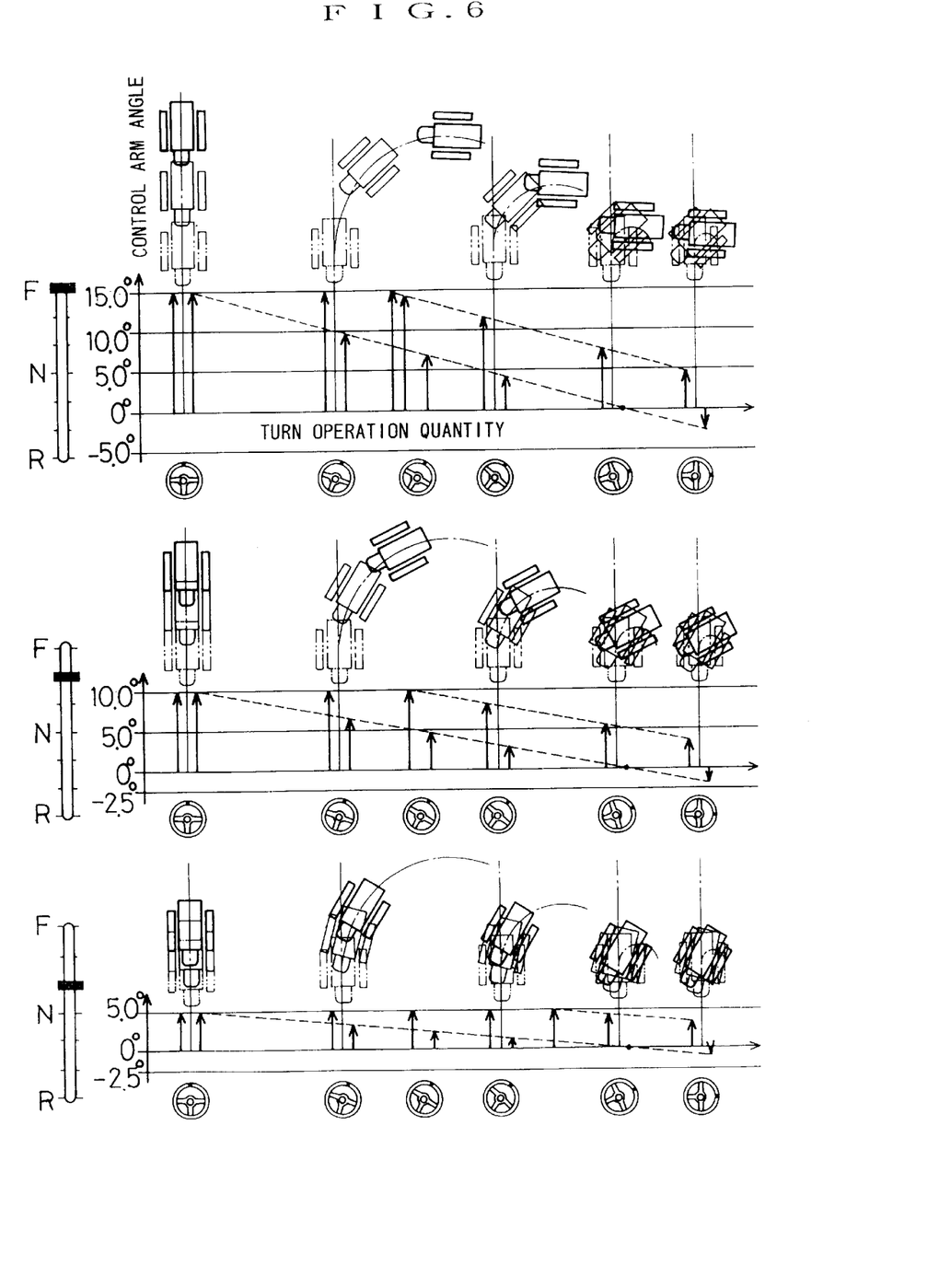
FIG. 6 is a view showing movements of the crawler truck.

FIG. 1 is a side view of a crawler truck with a continuously variable transmission having a speed change operation device according to a preferred embodiment of the present invention, FIG. 2 is a rear view thereof, FIG. 3 is an enlarged view of an essential part of the speed change operation device and FIGS. 4 to 6 are views showing states of action and characteristics of action thereof. In this embodiment, a static hydraulic pressure type continuously variable transmission is used as the continuously variable transmission.

On a car body 2 of the crawler truck 1 is provided a loading platform 3 and in the rear of the loading platform 3 are disposed an internal combustion engine 4 and a pair of right and left static hydraulic pressure type continuously variable transmissions 5. On each of right and left sides of the car body 2, caterpillar supporting wheels 6 are arranged in front and rear at regular intervals, a caterpillar driving wheel 7 is disposed in rear of the caterpillar supporting wheels 6, and an endless caterpillar 8 is wound round the caterpillar supporting wheels 6 and the caterpillar driving wheel 7. The right and left caterpillars are revolved separately by respective right and left caterpillar driving wheels 7. The caterpillar supporting wheel 6, the caterpillar driving wheel 7 and the caterpillar 8 constitute a running apparatus of the vehicle 1.

A steering wheel 9 is provided on a rear part of the car body 2 directed obliquely rearward and upward and on the left of the steering wheel 9 is provided a change lever 10 so as to rock front and rear pivotally supported by a change box (not shown). A tip end of the change lever 10 is connected to respective first movable members 32 of a pair of right and left speed change operation device units 30 at positions in the neighborhood of tops of the movable members. Thus, the speed change operation device 30 is composed of two units, but hereinafter each unit is also called speed change operation device. The right and left speed change operation devices 30 have a base plate 28 fixed by bolts and nuts to an attaching plate 27 laid between right and left frame pipes 26, 26 below the steering wheel 9.

An endless V belt 15 is wound round a drive pulley 12 fitted on a crankshaft 11 of the internal combustion engine 4 and a driven pulley 14 fitted on an input shaft 13 of the static hydraulic pressure type continuously variable transmission 5 directed in parallel with the crankshaft 11, and a tension pulley 17 is pivotally supported at a tip end of a clutch arm 16 which is supported so as to rock for approaching and leaving the endless V belt 15.

A tension clutch lever 18 and a loading platform detaching lever 19 are pivotally supported so as to move in front of the steering wheel 9. When the tension clutch lever 18 is moved forward, the clutch arm 16 moves to press the tension pulley 17 against the endless V belt 15, which is strained to transmit power of the internal combustion engine 4 to the static hydraulic pressure type continuously variable transmission 5. When the tension clutch lever 18 is moved rearward, the clutch arm 16 moves in the reverse direction to separate the tension pulley 17 from the endless V belt 15 so that no power of the internal combustion engine 4 is transmitted to the static hydraulic pressure type continuously variable transmission 5.

The static hydraulic pressure type continuously variable transmission 5 is not illustrated in detail, but it is an ordinary machine which is composed of a swash-plate type axial piston pump rotationally driven by power from the internal combustion engine 4 to produce pressure oil, a swash-plate type axial piston motor driven by the pressure oil produced by the pump, a trochoid pump for feeding oil into a hydraulic circuit, a housing and a base plate integrally connected to the housing. As shown in FIG. 2, rotary shafts of a pair of right and left swash-plate type axial piston pumps are connected coaxially with the input shaft 13 on the left side and a pair of right and left swash-plate type axial piston motors are disposed side by side with their rotary shafts directed in parallel with the rotary shafts of the pumps.

Each swash-plate type axial piston pump has a shaft 20 for rocking the swash-plate to control quantity of the pressure oil produced by the pump. The swash-plate rocking shaft 20 projects rearward penetrating the housing of the static hydraulic pressure type continuously variable transmission 5 and a control arm 21 is integrally fixed to the shaft 20. The control arm 21 is rocked by the speed change operation device 30, to be mentioned later in further detail, through a link mechanism 33, thereby output of the swash-plate type axial piston motor is controlled. The output shafts of the right and left motors are directly connected to respective right and left caterpillar driving wheels 7 so that revolution speeds of the right and left caterpillars 8 are controlled independently of each other.

Next, the speed change operation device 30 will be described. Corresponding to a pair of right and left running apparatuses, a pair of right and left speed change operation devices 30 each having substantially the same construction as shown in FIG. 3 are provided. The description will be made with respect to the speed change operation device 30 on the left side mainly and lastly constructive differences between the right and left speed change operation devices 30 will be described.

The speed change operation device 30 comprises a first movable member 32 connected to the change lever (speed change operation member) 10 and pivotally supported on a rotation support shaft (a fixed shaft) 31 so as to rotate about it, and a second movable member 35 shaped like a triangular plate pivotally supported on a rotation support shaft (a fixed shaft) 34 so as to rotate about it and connected to the swash-plate rocking shaft 20, which is a speed change operation quantity input section of the continuous variable transmission 5, through a link mechanism 33 and the control arm 21. An end of the link mechanism 33 is connected to a rocking end at a lower (in the figure) part of the second movable member 35.

Further, the speed change operation device 30 has a third movable member 36 and a fourth movable member 37 between the first movable member 32 and the second movable member 35. The third movable member 36 is pivotally supported by a rock shaft 38 planted on the first movable member 32 directing in right and left direction. A coil spring 39 is inserted between the third movable member 36 and the rock shaft 38 for forcing the third movable member 36 normally against a stopper 40 planted on the first movable member 32.

Therefore, the third movable member 36 is rotated together with the first movable member in a body when the first movable member 32 is rotated by operation of the change lever 10 about the rotation support shaft 31, and rotated independently of the first movable member 32 against the compulsory force of the coil spring 39 when pulled by a turn operation cable 41. In order to limit the maximum value of quantity of the independent rotation for a safe turn of the vehicle, a stopper 46 is planted on the first movable member 32.

The fourth movable member 37 has an end pivotally supported by a rock shaft 42 planted on a rocking end of the third movable member 36 and another end pivotally supported by a rock shaft 43 planted on a rocking end at an upper (in the figure) part of the second movable member 35 so as to transmit rotating force of the third movable member 36 to the second movable member 35.

When the speed change operation device 30 is in a neutral position, the connection part of the fourth movable member 37 to the second movable member 35 (pivotal support part by the rock shaft 43) is positioned coaxial with the rock shaft 38. Namely, at that time, the rock shaft 43 and the rock shaft 38 are positioned on the same axis.

The second movable member 35 integrally provided with a first assembly 44, which comprises a cylindrical sleeve 44a fitted on the second rotation support shaft 34 for pivotally supporting the second movable member 35 so as to rotate about the second rotation support shaft 34, an arm 44b integrally fixed to the cylindrical sleeve 44a perpendicularly thereto, and a pin 44c integrally fixed to the arm 44b perpendicularly thereto so as to extend in parallel with the second rotation support shaft 34.

The above-mentioned first assembly 44 is provided integrally on the second movable member 35 of the left side speed change operation device 30. On the other hand, the second movable member 35 of the right side speed change operation device 30 is provided with a second assembly 45 integrally, which comprises a cylindrical sleeve 45a fitted on the second rotation support shaft 34 for pivotally supporting the second movable member 35 so as to rotate about the second rotation support shaft 34, a plate member 45c integrally fixed to the cylindrical sleeve 45a perpendicularly thereto, and a opening 45b formed on a lateral part of the plate member 45c in which the pin 44c can be loosely fitted.

The opening 45b is formed in a rectangle prolonged vertically. Though not shown in the figure, upper and lower L-shaped members having sides disposed in parallel with the shorter side of the above rectangle are attached to the plate member 45c using upper and lower bolt holes 45d, 45d, respectively, and length of the rectangle is adjusted by adjusting attaching position of the L-shaped members. For this adjustment, the L-shaped members have prolonged hole for inserting bolts. This adjustment is carried out for adjusting the neutral position of the right side speed change operation device 30.

The left and right speed change operation devices 30, 30 differ only in respect of the first assembly 44 and the second assembly 45. These assemblies 44, 45 may be replaced with each other.

Other ends of a pair of left and right turn operation cable (turn operation member) 41 are connected to respective right and left front ends of a sector gear 24 engaging with a pinion 23 attached to a lower end of a steering shaft 22. When the steering wheel 9 is steered to the right for example, the pinion 23 rotates to the right and the sector gear 24 rotates to the left about a rotary shaft 25. Therefore, the right side turn operation cable 41 is pulled to move the rocking end of the right side third movable member 35 against the compulsory force of the coil spring 39. In the meantime, the left side third movable member 36 is kept stationary abutted against the stopper 40. The left and right turn operation cables 41 extend from above-mentioned other ends connected to the right and left front ends of the sector gear 24, passing through cable support members (not shown) attached to right and left portions of a bracket 25a for attaching the rotary shaft 25, to the rocking ends of the left and right third movable members 36 and are connected to the rocking ends.

Above-mentioned speed change operation device works as follows.

When the change lever 10 is pushed forward, the right and left first movable members 32 are rotated clockwise (in the left direction) in FIG. 3 about the rotation support shaft 31, and coupled with those, the right and left third movable members 36, the right and left fourth movable members 37 and the right and left second movable members 35 are rotated in similar manners right and left. Each second movable member 35 moves, through the link mechanism 33, the control arm 21 which rocks to rotate the swash-plate rocking shaft 20 so that a swash-plate rocks from a neutral position, where the swash-plate is not inclined with regard to a pump rotary shaft, to a predetermined position where the swash-plate is inclined toward a side corresponding to forward movement of the vehicle. Thus, the vehicle 1 goes straight ahead at a predetermined speed.

According to cases that the change lever 10 is pulled forward by a middle quantity or a maximum quantity, the vehicle 1 goes ahead at a predetermined middle or highest speed. When the change lever 10 is pushed backward, the vehicle 1 goes back at a predetermined speed. States of rock and rotation of the movable members 32, 36, 37, 35 in these cases are shown in FIG. 4(a).

As is apparent from FIG. 4(a), the first movable member 32 and the second movable member 35 always rotate in opposite directions to each other. The rock shafts 38 and 43 which are positioned on the same axis in the neutral state, are slightly dislocated with each other in the reverse relation in accordance with whether it is forward movement state or backward movement state. In FIG. 4, respective two-dots-dash lines show direction of respective straight lines connecting specific points A and F of the first movable member 32 and specific points B and G of the second movable member 35 in the neutral position.

Points A, B, C, D and E in FIG. 4 show axes of the rotation support shaft 31, the rotation support shaft 34, the rock shaft 38, the rock shaft 42 and the rock shaft 34, respectively. The point F shows the connection point of the change lever 10 to the first movable member 32, the point G shows the connecting point of the link mechanism 33 to the second movable member 35 and the point H shows the connecting point of the turn operation cable 41 to the third movable member 36.

In the state that the vehicle is going forward at a predetermined speed as mentioned above, if the steering wheel 9 is steered toward the right to turn the vehicle to the right, the pinion 23 rotates to the right to rotate the sector gear 24 engaging with the pinion 23 to the left about the rotary shaft 25. The right side turn operation cable 41 is pulled to move rotationally the rocking end of the right side third movable member 36 against the compulsory force of the coil spring 39.

As the result, as shown in FIG. 4(b),(c), the second movable member 35 rotates through rocking of the fourth movable member 37 toward the neutral position and the swash-plate, rocking shaft 20 of the right side static hydraulic pressure type continuously variable transmission 5 rotates so as to reduce rotational speed of the right side caterpillar driving wheel 7. Thus, right turn of the vehicle 1 is possible. Return movement of the second movable member 35 toward the neutral position is faster as steering angle of the steering wheel 9 is larger, as obvious from FIG. 4 too.

In case of FIG. 4(c) in which steering angle of the steering wheel 9 is about 90°, the second movable member 35 shifts to the backward movement side over the neutral position, so that the right side caterpillar driving wheel 7 rotates in reverse and the vehicle carries out an extreme turn relying upon the earth as understood from FIGS. 5, 6 too. The "control arm angle" of ordinate of FIGS. 5, 6 means speed change operation quantity to be inputted to the continuously variable transmission. This angle is equal to rock angle (angle of rotation) of the swash-plate rocking shaft 20 naturally and corresponds to vehicle speed. In FIG. 6, each pair of upward arrows show rotational speeds of caterpillar driving wheels on the inner and outer sides of turning (outer and inner wheels) at respective steering angles of the steering wheel 9. Though the each pair of upward arrows are shown separated laterally for better understanding, exact speeds at any steering angle are given by cross points of the inclined dotted lines and a vertical line at a position corresponding to the steering angle.

When the vehicle 1 is going ahead at a predetermined speed, if the steering wheel 9 is steered to the right beyond a predetermined angle, turn operation quantity (quantity of pull) by the turn operation cable 41 of the right side speed change operation device 30 exceeds a predetermined value and quantity of rotation of the corresponding second movable member 35 also exceeds a predetermined value, so that the opening 45b formed in the plate member 45c of the second assembly 45 begins to engage with the pin 44c of the first assembly 44 of the second movable member 35 of the left side speed change operation device 30.

Accordingly, also the second movable member 35 of the left side speed change operation device 30 begins to rotate in the same direction as the rotation of the second movable member 35 of the right side speed change operation device 30 and the left side swash-plate rocking shaft 20 is rotated through the corresponding link mechanism 33 and control arm 21 to reduce rotational speed of the left side caterpillar driving wheel 7. Thus, a predetermined difference in angle of rotation is kept between the right and left swash-plate rocking shafts 20, 20 so that the vehicle 1 turn to the right slowly and safely keeping a predetermined speed difference between the right and left caterpillar driving wheels 7, 7.

When forward or backward speed of the vehicle 1 is large, the opening 45b formed in the plate member 45c of the second assembly 45 is disposed so that the longer side of the opening 45b makes substantially a right angle with the direction of rotation of the first assembly 44 or the direction of rotation of the pin 44c, therefore the engaging of the opening 45b and the pin 44c is commenced in an earlier stage of steering of the steering wheel 9 compared with other cases. Namely, as the forward or backward speed of the vehicle 1 is larger, speed reduction of the caterpillar driving wheel 7 on outer side of turn is commenced earlier. FIGS. 5 and 6 shows this situation.

Also in case the steering wheel 9 is steered to the left to turn the vehicle to the left, the actions of the speed change operation device 30 are similar to the above, therefore, detailed description of this case is omitted.

The above-mentioned speed change operation device 30 has advantages as follows.

Since each pair of the first movable members 32, the second movable members 35, the third movable members 36 and the fourth movable members 37 of both right and left speed change operation devices 30 rotate in the same direction, respectively, and the rotation support shafts 31, 34 and the rock shafts 38, 42, 43 do not cross each other, the number of rotation support shafts and rock shafts can be reduced, rotation wear can be decreased and operation-easiness and wear-resistance of the speed change operation device 30 can be improved.

Because the number of rotation support shafts and rock shafts is reduced, parts liable to cause shake such as plates (movable members) to be pivotally supported on the above shafts are lessened and accuracy of speed change control is improved. Further, it is possible to simplify the construction of the device for miniaturizing it.

By the simple combination of the pin 44c of the first assembly and the opening 45b of the second assembly, when a turn instruction operation quantity to either speed change operation device 30 exceeds a predetermined value, the running apparatus of another side can be decelerated with very pertinent timing and very easily.

The speed change operation device has a very wide applicability. It is applicable to various kinds of continuously variable transmissions such as static hydraulic pressure type-, belt type-, cone type- or friction type- continuously variable transmission to be mounted on various kinds of vehicles of walking type or riding type with caterpillar or wheels such as crawler truck, construction machine with caterpillar, cultivator or snowmobile.

Figure 7:
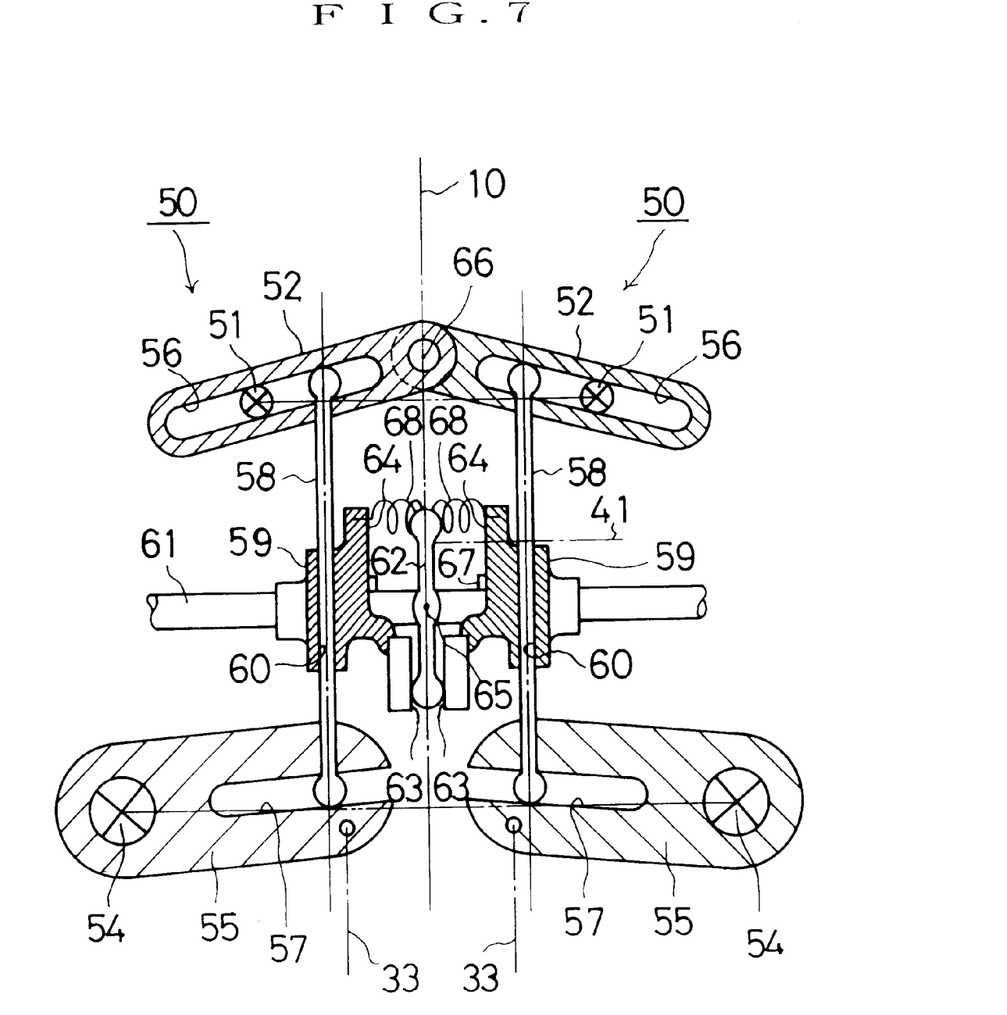
FIG. 7 is a vertical sectional view of a speed change operation device according to another preferred embodiment of the present invention.
Figure 8:
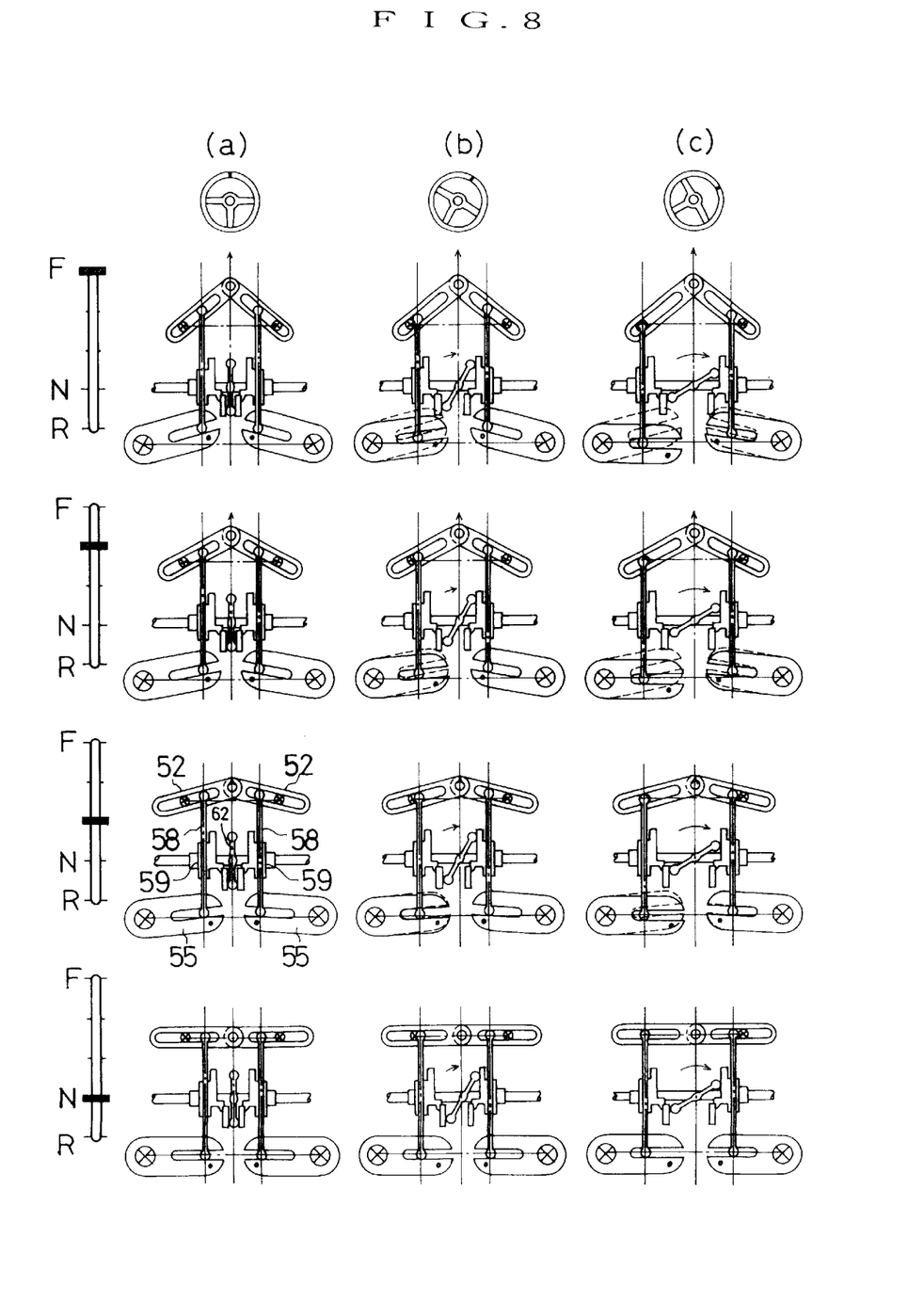
FIG. 8 is a view showing states of action of the same speed change operation device.

FIGS. 7 and 8 show a speed change operation device according to another preferred embodiment of the present invention. Also in this embodiment, a pair of right and left speed change operation devices 50 of the same construction are provided corresponding to a pair of right and left running apparatuses. Hereinafter, mainly the left side speed change operation device 50 will be described.

The speed change operation device 50 has a first movable member 52 connected to the change lever (speed change operation member) 10 and a second movable member 55 connected to the swash-plate rocking shaft 20, which is a speed change operation quantity input section of the continuously variable transmission 5, through the link mechanism 33 and the control arm 21 and pivotally supported so as to rotate about a rotation support shaft (a fixed shaft) 54. An end of the link mechanism 33 is connected to the second movable member 55 at a lower part of a rocking end positioned in the neighborhood of a center in the figure.

The first movable member 52 has a lengthwise slide slot 56 through which a rotation support shaft (a fixed shaft) 51 is passed. The first movable member 52 can rotate about the rotation support shaft 51 and slide in the direction of the slide slot 56. The right and left first movable members 52 are pivotally connected to each other at ends in a central part. The connection point 66 can be moved up and down by operation of the change lever 10. The second movable member 55 has a slide slot 57 with an end opened.

Between the first movable member 52 and the second movable member 55 is inserted a connecting rod 58 which is a third movable member for connecting the first and second movable members so as to rotate relatively and has a globular end fitted in the slide slot 56 of the first movable member 52 so as to rotate and slide, another globular end fitted in the slide slot 57 of the second movable member 55 so as to rotate and slide and a middle part slidingly passing through a vertical guide hole 60 formed in a cam body 59 which is a fourth movable member.

The cam body 59 can slide right and left along a guide shaft 61. On a lower part of a side of the cam body 59 facing a center of the whole device is formed a lower cam surface 63 against which a lower end of a turning lever 62, which is a fifth movable member, can abut. On an upper part of the above-mentioned side of the cam body 59 is formed an upper cam surface 64 against which an upper end of the turning lever 62 can abut. The turning lever 62 is supported at the middle so as to rotate about a rotation support shaft (a fixed shaft) 65 and operated by the turn operation cable (turn operation member) 45 to rotate. Springs 68 are interposed between the turning lever 62 and respective right and left cam bodies 59 so that the cam bodies 59 are forced always toward the center of the whole device or a neutral position of the turning lever 62. 67 denotes a stopper for regulating slide of the cam body 59 toward the center of the whole device.

This latter speed change operation device works as follows.

When the change lever 10 is pushed forward, the connection point 66 is pulled upward and right and left first movable members 52 increase their inclinations rotating about the rotation support shafts 51. At the same time, the right and left connecting rods 58 are pulled upward and the right and left second movable members 55, which engage with the lower globular ends of the connecting rods 58 rotatively and slidingly, rotate upward symmetrically to pull up the link mechanisms 33 (see FIG. 8(a)). Then the right and left swash-plate rocking shafts 20 are rotated through the control arms 21 so that the swash-plate is rocked from a neutral position not inclined with respect to the pump rotary shaft to an inclined specific position corresponding to forward movement of the vehicle. As the result, the swash-plate motor outputs a power to move the vehicle 1 forward at a specific speed corresponding to degree of movement of the change lever 10.

In this state, if the steering wheel 9 is steered to the right to turn the vehicle to the right, the turning lever 62 is rotated to the right in the figure by the turn operation cable 41 and the lower end of the lever 62 abuts against the lower cam surface 63 of the left side cam body 59 to move it toward the left. Then, the left side connecting rod 58 moves downward guided by the slide slot 56 of the left side first movable member 52 to rotate the left side second movable member 55 downward or in the direction for returning to the neutral position, so that the rotational speed of the right side caterpillar driving wheel is reduced to turn the vehicle 1 to the right. In this connection, the left side second movable member 55 is connected through the link mechanism to the right side control arm 21, and the right side second member to the left side control arm. The upper end of the turning lever 62 abuts against the upper cam surface 64 of the right side cam body 59, but the cam body 59 has not come to be moved to the right yet (see FIG. 8(b)).

When the steering wheel 9 is steered to the right further, the upper end of the turning lever 62 pushes the right side cam body 59 to move it to the right, therefore the right side connecting rod 58 moves downward in the same manner as the left side connecting rod 58 to rotate the right side second movable member 55 downward or in the direction for returning to the neutral position (see FIG. 8(c)). As the result, rotational speed of the left side caterpillar driving wheel 7 is also reduced so that the vehicle 1 turns to the right at a moderate speed safely. FIG. 8 shows states of action of the speed change operation device 50 at each steering angle of the steering wheel 9 when forward speed of the vehicle is changed in three steps.

The speed change operation device 50 has substantially the same advantages as the aforementioned speed change operation device 30, but according to the device 50, when a turn operation instruction quantity to either of right and left speed change operation devices exceeds a predetermined value, speed of the running apparatus on another side can be reduced very easily by a simple construction.

What is claimed is:

1. A speed change operation device for a vehicle with a continuously variable transmission having a running apparatus, a power source and a continuously variable transmission for transmitting power from the power source to the running apparatus, comprising:

a first movable member operated by a speed change operation member to rotate;

a second movable member connected to a speed change operation quantity input section of said continuously variable transmission through a transmission means to change speed of said continuously variable transmission;

a first rotation support shaft pivotally supporting said first movable member; and a second rotation support shaft disposed in parallel with said first rotation shaft for pivotally supporting said second movable member, said first and second movable members being connected with each other so that a rotating force is transmitted from said first movable member to said second movable member.

2. A speed change operation device for a vehicle with a continuously variable transmission as recited in claim 1, wherein said vehicle has a pair of right and left running apparatuses and said continuously variable transmission and a separate speed change operation device is provided for each of said running apparatuses.

3. A speed change operation device for a vehicle with continuously variable transmission having a right and left running apparatuses, a power source and a pair of right and left continuously variable transmissions for transmitting power from the power source to the running apparatuses, wherein, said speed change operation device has a pair of right and left speed change operation units each comprising:

a first movable member operated by a speed change operation member to rotate;

a second movable member connected to a speed change operation quantity input section of said continuously variable transmission through a transmission means to change speed of said continuously variable transmission;

a first rotation support shaft pivotally supporting said first movable member;

a second rotation support shaft disposed in parallel with said first rotation support shaft for pivotally supporting said second movable member;

a third movable member pivotally supported by a shaft mounted on said first movable member to rotate with said first movable member in a body and also to be operated by a turn operation member independently of said first movable member; and a fourth movable member having an end pivotally connected to said third movable member and another end pivotally connected to said second movable member, a connecting portion of the fourth movable member with said second movable member being positioned concentrically with said shaft pivotally supporting said third movable member when said speed change operation device is in a neutral position.

4. A speed change operation device for a vehicle with continuously variable transmission as recited in claim 3, wherein when said third movable member of one of said right and left speed change operation units is rotated by operation of said turn operation member independently of said first movable member over a predetermined amount of rotation, said third movable member of the other one of said right and left speed change operation units rotates together with said third movable member of said one of said right and left speed change operation units.

5. A speed change operation device for a vehicle with continuously variable transmission as recited in claim 3, wherein:

said second movable member of one of said right and left speed change operation units has a first and second assembly attached integrally, and said second movable member of the other one of said right and left speed change operation units has a second or a first assembly attached integrally, said first assembly comprises a cylinder sleeve fitted on corresponding said second rotation support shaft so that said second movable member is pivotally supported by said second rotation support shaft, an arm fitted to said cylindrical sleeve at right angles, and a pin fixed to said arm at right angles so as to extend in parallel with said second rotation support shaft, said second assembly comprises a cylindrical sleeve fitted on corresponding said second rotation support shaft so that said second movable member is pivotally supported by said second rotation support shaft, a plate member fixed to said cylindrical sleeve at right angles and an opening formed on one side of said plate member in which said pin can be loosely fitted, and when said third movable member of said one speed change operation unit is rotated by operation of said turn operation member independently of said first movable member so far as a predetermined amount of rotation, said pin begins to engage with said opening formed in said plate member.

6. A speed change operation device for a vehicle with continuously variable transmission as recited in claim 5, wherein said predetermined amount of rotation is set smaller as a speed change operation quantity of said continuously variable transmission set by operation of said speed change operation member is larger.

7. A speed change operation device for a vehicle with continuously variable transmission as recited in claim 1, wherein a forcing means is inserted between said first movable member and said third movable member for forcing these members so as to rotate relatively, and a stopper for determining relative positions of said first and third movable members is provided on either of said first and third movable members to rotate said third movable member together with said first movable member.

8. A speed change operation device for a vehicle with continuously variable transmission as recited in claim 7, wherein a stopper for limiting a maximum value of amount of rotation of said third movable member caused by operation of said turn operation member independently of said first movable member is provided on said first movable member.

9. A speed change operation device for a vehicle with continuously variable transmission having a pair of right and left running apparatuses, a power source and a pair of right and left continuous variable transmissions for transmitting power from the power source to the running apparatuses, wherein said speed change operation device has a pair of right and left speed change operation units each comprising:

a first movable member operated by a speed change operation member to rotate;

a second movable member connected to a speed change operation quantity input section of said continuously variable transmission through a transmission means to change speed of said continuously variable transmission;

a third movable member, a fourth movable member and a fifth movable member inserted between said first movable member and said second movable member;

a first rotation support shaft pivotally supporting said first movable member;

a second rotation support shaft disposed in parallel with said first rotation support shaft for pivotally supporting said second movable member; and a third rotation support shaft disposed in parallel with said first rotation support shaft for supporting said fifth movable member so as to rotate about a central axis thereof, said third movable member having an end fitted so as to rotate and slide in a slide slot formed in said first movable member which said first rotation support shaft passes through, another end fitted so as to rotate and slide in a slide slot formed in said second movable member and a middle portion slidingly passing through a vertical guide hole formed in said fourth movable member which is disposed between said first and second movable members and supported so as to move horizontally, said third movable member being moved vertically as said first movable member rotates and horizontally and vertically independently of said first movable member through said fourth and fifth movable members by operation of a turn operation member for transmitting rotating force of said first movable member and horizontal moving force of said fourth movable member to said second movable member, said fourth movable member has a lower cam face and an upper cam face formed on an end surface facing to another speed change operation unit and said lower cam face is projected toward said another speed change operation unit compared with said upper cam face by a predetermined short length, said fifth movable member is rotated by operation of said turn operation member and has an end abutting against both lower cam faces of said fourth movable members of said right and left speed change operation units when said speed change operation device is in a neutral position, and another end abutting against either of said both upper cam faces when said fifth movable member is rotated beyond a predetermined quantity, and when said fifth movable member of either speed change operation unit is rotated beyond said predetermined quantity, said fourth movable member of another speed change operation unit is moved in a direction opposite to moving direction of said fourth movable member of said either speed change operation unit.

10. A speed change operation device for a vehicle with continuously variable transmission as claimed in claim 3, wherein a forcing means is inserted between said first movable member and said third movable member for forcing these members so as to rotate relatively, and a stopper for determining relative positions of said first and third movable members is provided on either of said first and third movable members to rotate said third movable member together with said first movable member.

11. A speed change operation device for a vehicle with continuously variable transmission as claimed in claim 10, wherein a stopper for limiting a maximum value of amount of rotation of said third movable member caused by operation of said turn operation member independently of said first movable member is provided on said first movable member.

\* \* \* \* \*